3,138,630
SYNTHESIS OF β-CYANOVINYL HYDRAZINES

Frank Scotti, Stamford, Conn., and Everett Joseph Frazza, Yorktown Heights, N.Y., assignors to American Cyanamid Company, New York, N.Y., a corporation of Maine
No Drawing. Filed Nov. 29, 1960, Ser. No. 72,293
5 Claims. (Cl. 260—465)

This invention relates to β-cyanovinyl hydrazines and to a process for preparing the same. More particularly, it relates to β-cyanovinyl hydrazines which may be represented by the following structural formula:

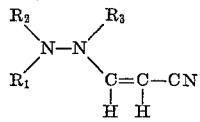

in which $R_1$, $R_2$, and $R_3$ each represent a hydrogen atom, an alkyl, aryl, alkaryl, halogen substituted aryl or alkoxy substituted aryl group. Suitable alkyl groups are methyl, ethyl, propyl, butyl and higher alkyl groups; typical aryl groups are phenyl, naphthyl and the like; illustrative alkaryl groups are those of the phenyl series containing at least one nuclear lower alkyl substituent including, methyl, ethyl and the like; suitable halogen substituents are chlorine and bromine; suitable alkoxy groups substituents are methoxy, ethoxy, propoxy, butoxy and the like.

According to the present invention such new compounds as those depicted above are readily prepared by condensing a hydrazine of the general formula $$R_1R_2NNR_3H$$

in which $R_1$, $R_2$ and $R_3$ have the values as set forth hereinabove, with β-chloroacrylonitrile in an inert reaction medium at temperatures of from about 20° C. to about 100° C. Subsequent recovery of the β-cyanovinyl hydrazine is accomplished by cooling of the reaction mixture and filtration of the product therefrom. The β-cyanovinyl hydrazine product is then recovered from the reaction mixture by filtration, distillation or other conventional method of separation.

It is a feature of this invention that various hydrazines of the formula $R_1R_2NNR_3H$ can be readily condensed with β-chloroacrylonitrile so as to obtain the corresponding β-cyanovinyl hydrazine in good yield. Illustrative hydrazines which may be employed according to the process of this invention are: hydrazine, methyl hydrazine, 1,1 dimethylhydrazine, 1,2 dimethylhydrazine, trimethyl hydrazine, triethyl hydrazine, phenyl hydrazine, o-tolyl hydrazine, m-tolyl hydrazine, p-tolyl hydrazine, 2,5 dimethyl phenyl hydrazine, p-bromophenyl hydrazine, m-chlorophenyl hydrazine, p-chlorophenyl hydrazine, p-methoxyphenyl hydrazine, p-ethoxyphenyl hydrazine and the like.

The particular reaction medium employed in the process of this invention is restricted only in that it be inert to the reactants and is preferably a solvent therefor. Any of the conventional materials generally employed in this capacity are suitable. Aromatic hydrocarbons such as benzene, toluene, xylene and the like and their halogenated derivatives; amides such as dimethyl formamide; esters such as ethyl acetate; ethers such as dioxane and the like may all be used.

While equimolecular quantities of each of the reactants are generally employed, a slight excess of either the hydrazine reactant or β-chloroacrylonitrile reactant apparently does not influence the over-all rate of reaction or interfere with recovery of the product from the reaction mixture.

While temperatures between about 20° C. and about 100° C. may be employed, it is generally preferred that the process be carried out within a temperature range of from about 40° C. to about 85° C. Depending upon the particular hydrazine reactant employed and the temperature employed, the time for reaction to be completed may vary from about several to about 20 hours.

Although the order of addition of the reactants is not especially critical, it is preferred that a β-chloroacrylonitrile be added to the hydrazine reactant in order to minimize and moderate the heat of the exothermic reaction.

In order to illustrate the present invention but not to limit it thereto, the following examples in which all parts are by weight are given:

Example 1

Into a suitable reaction vessel equipped with stirrer, reflux condenser and thermometer are introduced 9.8 parts of phenyl hydrazine and 50 parts of benzene. Subsequently, 8.7 parts of β-chloroacrylonitrile are added slowly over a period of thirty minutes while the temperature of the reaction mixture is maintained at 60° C. with stirring. The reaction mixture is held at a temperature of 60° C. for six hours. At the end of this time, the reaction mixture is cooled and phenyl hydrazine hydrochloride is removed by filtration. Approximately ½ of the benzene is evaporated under reduced presure. Crystallization of β-cyanovinylphenylhydrazine is induced by cooling. Filtration of the solid product from the benzene mother liquor results in a recovery of 6.5 parts of pale orange needles, melting point 80–85° C.

Example 2

The procedure of Example 1 is repeated in all essential respects excepting that 3.2 parts of hydrazine are employed and the temperature of reaction is 25° C. A good yield of β-cyanovinyl hydrazine is recovered.

When the procedure of the preceding examples is repeated employing various other alkyl and aryl substituted hydrazines, similar results are obtained.

Compounds prepared according to the process of this invention are valuable intermediates in the preparation of other compounds. Additionally, β-cyanovinyl hydrazines of the general formula set forth hereinabove are capable of being used in agricultural applications as herbicides and nematocides. Thus, a typical compound of this class, β-cyanovinylphenyl hydrazine has demonstrated herbicidal and nematocidal activity as is shown from an inspection of the test results appearing in the following table:

| | Table I | | | | Table II |
|---|---|---|---|---|---|
| | Herbicidal Activity, Percent Seed Mortality | | | | Nematocidal Activity, Percent Mortality, $T.\ aceti$, 0.1 |
| | Wheat Seeds Conc. | | Radish Seeds Conc. | | |
| | 0.1 | 0.01 | 0.1 | 0.01 | |
| —NH—NH—CH=CH—C≡N | 72 | 2 | 96 | 6 | 100 |

Referring to Table I above, a water mixture of the percentage indicated therein of β-cyanovinylphenylhydrazine, obtained according to the process of the present invention, is prepared and seeds of each species, representing monocotyledonous and dicotyledonous plants are admixed therewith for a 20 hour period. After this period the seeds are washed and are held in a high humidity atmosphere for a five day germination period before the percent seed mortality is recorded.

Referring to Table II above, a water mixture of 0.1% of β-cyanovinylphenylhydrazine, prepared according to the process of the present invention, is prepared and nematodes admixed therewith for a twenty hour period. Immediately thereafter percent mortality is recorded.

Obviously the compounds of the present invention manifest varying degrees of herbicidal and nematocidal activity and the above illustration is merely typical.

We claim:
1. A process for preparing β-cyanovinyl hydrazine of the formula:

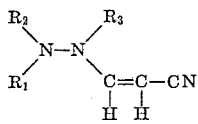

in which $R_1$, $R_2$ and $R_3$ are each selected from the group consisting of hydrogen, alkyl having from one to four carbon atoms, phenyl, naphthyl and mono-substituted phenyl, said substituents being selected from the group consisting of alkyl selected from those having from one to four carbon atoms; halogen selected from the group consisting of bromine and chlorine; and alkoxy in which the alkyl moiety thereof is selected from those having from one to four carbon atoms which comprises condensing a hydrazine of the formula $R_1R_2NNR_3H$ wherein $R_1$, $R_2$ and $R_3$ have the values as hereinabove with β-chloroacrylonitrile in a reaction medium inert to said hydrazine and said β-chloroacrylonitrile reactants at a temperature of from about 20° C. to about 100° C. and recovering resultant β-cyanovinyl hydrazine.

2. A process as in claim 1 in which $R_1$ is phenyl and $R_2$ and $R_3$ are each hydrogen.

3. A β-cyanovinyl hydrazine of the formula:

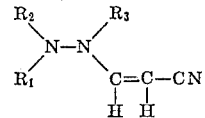

in which $R_1$, $R_2$ and $R_3$ are each selected from the group consisting of hydrogen, alkyl having from one to four carbon atoms, phenyl, naphthyl and mono-substituted phenyl, said substituents being selected from the group consisting of alkyl selected from those having from one to four carbon atoms; halogen selected from the group consisting of bromine and chlorine; and alkoxy in which the alkyl moiety thereof is selected from those having from one to four carbon atoms.

4. β-Cyanovinyl phenyl hydrazine.
5. β-Cyanovinyl p-tolyl hydrazine.

References Cited in the file of this patent
UNITED STATES PATENTS
2,792,296     Heininger _____ May 14, 1957
OTHER REFERENCES
Passalacqua: C.A., 8, 1273 (1914).